United States Patent
Liu et al.

(10) Patent No.: US 10,044,672 B2
(45) Date of Patent: Aug. 7, 2018

(54) IPV6 ADDRESS ASSIGNMENT METHOD AND APPARATUS

(71) Applicant: HUAWEI DEVICE CO., LTD., Shenzhen (CN)

(72) Inventors: De Liu, Shenzhen (CN); Jinfeng Zhang, Shenzhen (CN)

(73) Assignee: HUA WEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/123,448

(22) PCT Filed: Mar. 4, 2014

(86) PCT No.: PCT/CN2014/072840
§ 371 (c)(1),
(2) Date: Sep. 2, 2016

(87) PCT Pub. No.: WO2015/131327
PCT Pub. Date: Sep. 11, 2015

(65) Prior Publication Data
US 2017/0222970 A1  Aug. 3, 2017

(51) Int. Cl.
*H04L 29/12* (2006.01)
*H04L 12/66* (2006.01)

(52) U.S. Cl.
CPC .......... *H04L 61/2007* (2013.01); *H04L 12/66* (2013.01); *H04L 61/6059* (2013.01)

(58) Field of Classification Search
None
See application file for complete search history.

(56) References Cited

U.S. PATENT DOCUMENTS

| | | | |
|---|---|---|---|
| 2005/0041671 A1* | 2/2005 | Ikeda | H04L 29/12066 370/395.52 |
| 2008/0089293 A1* | 4/2008 | Madour | H04W 36/0016 370/331 |
| 2008/0320115 A1 | 12/2008 | Ding | |
| 2011/0110375 A1* | 5/2011 | Boucadair | H04L 29/12358 370/393 |

(Continued)

FOREIGN PATENT DOCUMENTS

| | | |
|---|---|---|
| CN | 1859420 A | 11/2006 |
| CN | 101753633 A | 6/2010 |

(Continued)

OTHER PUBLICATIONS

Nathan Lutchansky, "IPv6 Router Advertisement Prefix Delegation Option," Cornell University, Feb. 1, 2002, 6 pages.

(Continued)

*Primary Examiner* — Diane Lo
(74) *Attorney, Agent, or Firm* — Conley Rose, P.C.

(57) ABSTRACT

IPv6 address assignment method and apparatus are provided. The method includes: receiving first Prefix Delegations (PDs) sent by at least two network access devices, where the first PDs sent by the different network access devices are different from each other; generating second PDs according to the received first PDs, where the second PDs have a one-to-one correspondence with the first PDs; and sending the generated second PDs to user device for generating by the user device IPv6 addresses according to the second PDs.

18 Claims, 5 Drawing Sheets

(56) References Cited

U.S. PATENT DOCUMENTS

2012/0207168 A1* 8/2012 Kassi Lahlou ... H04L 29/12358
370/392

FOREIGN PATENT DOCUMENTS

| CN | 101986665 A | 3/2011 |
| CN | 102143036 A | 8/2011 |
| CN | 102299974 A | 12/2011 |
| CN | 102340546 A | 2/2012 |
| WO | 2012068869 A1 | 5/2012 |

OTHER PUBLICATIONS

Byung-Yeob Kim et al., "Hierarchical Prefix Delegation Protocol for Internet Protocol Version 6 (IPv6)," ETRI, Feb. 15, 2004, 13 pages.

F. Baker, "Prefix Sub-delegation in a SOHO/SMB Environment; draft-baker-ipv6-prefix-subdelegation-00," Cisco Systems. Jul. 25, 2009, 10 pages.

Chen Zhonghua et al., "Application Research on IPv6 Address (including partial English translation)," Shanghai Research Institute of China Telecom Co., Ltd., Shanghai, China, Mar. 5, 2013, 11 pages.

T. Chown, Ed. et al., "IPv6 Home Networking Architecture Principles draft-left-homenet-arch-12," University of Southampton, Sigma Designs, Cisco Systems, and Time Warner Cable, Feb. 14, 2014, 52 pages.

International Search Report and Written Opinion (including English translation) issued in corresponding International Application No. PCT/CN2014/072840, dated Dec. 16, 2014, 21 pages.

Office Action issued in corresponding Chinese Patent Application No. 201480001418.2, dated Nov. 28, 2016, 7 pages.

Extended European Search Report issued in corresponding EP Application No. 14884602, dated Jan. 31, 2017, 8 pages.

* cited by examiner

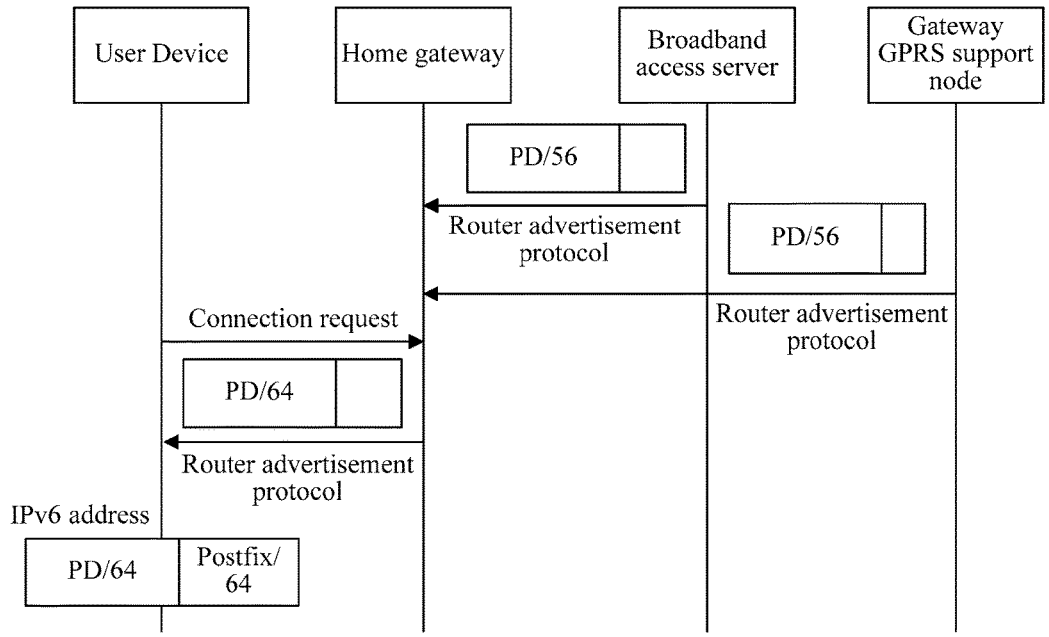
FIG. 1 (PRIOR ART)
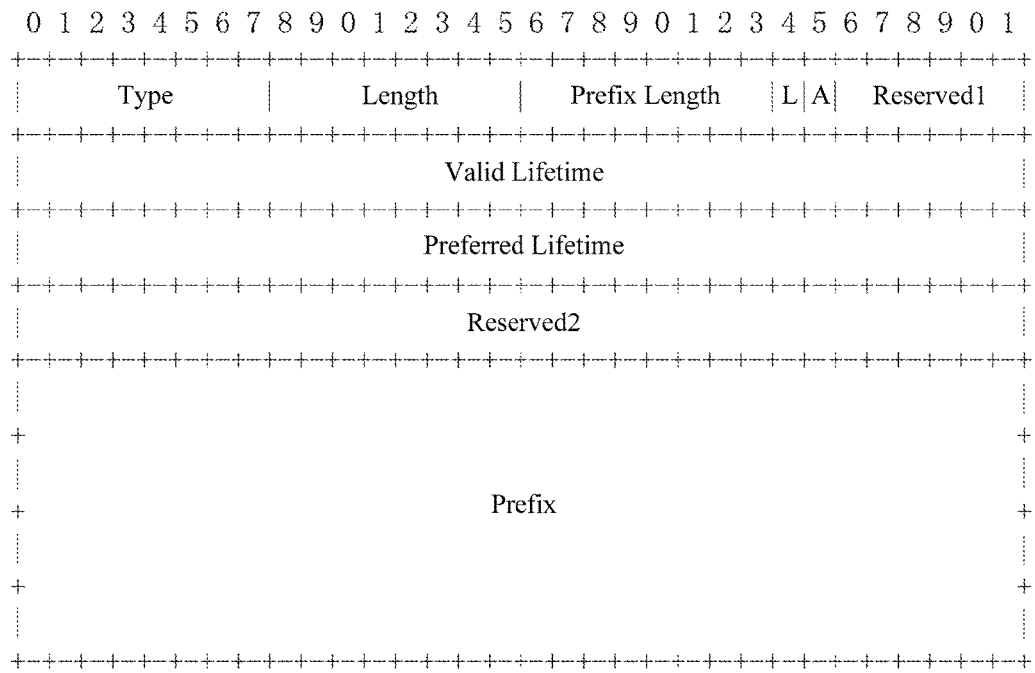
FIG. 2 (PIROR ART)

IPV6 ADDRESS ASSIGNMENT METHOD AND APPARATUS

CROSS-REFERENCE TO RELATED APPLICATIONS

This application is a National Stage of International Application No. PCT/CN2014/072840, filed on Mar. 4, 2014, which is hereby incorporated by reference in its entirety.

TECHNICAL FIELD

Embodiments of the present invention relate to communications technologies, and in particular, to an IPv6 address assignment method and apparatus.

BACKGROUND

A next generation IP protocol (Internet Protocol Version 6, IPv6 for short) is a next generation Internet Protocol designed by the Internet Engineering Task Force (Internet Engineering Task Force, IETF for short) and is used for replacing the current IPv4 protocol to resolve a problem of insufficient address space.

In a network to which the IPv6 is applicable, a home gateway may connect user device to the network by using multiple broadband access servers (Broadband Remote Access Server, BRAS for short) and/or multiple gateway GRPS support nodes (Gateway GPRS Support Node, GGSN for short), and any BRAS or any GGSN is connected to the home gateway to constitute a link, that is, the home gateway connects the user device to the network by using multiple links.

As shown in FIG. 1, a home gateway is connected to both BRAS and GGSN, and the BRAS and the GGSN separately send an ICMPv6 packet carrying Prefix Delegation (Prefix Delegation, PD for short) to the home gateway in advance by using a sub-protocol: a router advertisement (Router Advitication, RA for short) protocol in the Internet Control Message Protocol version 6 (Internet Control Message Protocol Version 6, ICMPv6 for short), where the PD is a data frame encapsulated in the ICMPv6 packet. A frame format of the PD is shown in FIG. 2, and if a value of a Prefix Length field is 56, it indicates that 56-bit address information of a Prefix field is the first 56 bits of an IPv6 address that can be assigned by a BRAS or GGSN delegated by a network-side server and a PD carrying a first 56 bits of the IPv6 address may also identify a link between the home gateway and the BRAS or GGSN; if a value of a Prefix Length field is 64, it indicates that 64-bit address information of a Prefix field is the first 64 bits of an IPv6 address that is sent by the home gateway to user device. After the user device sends a connection request to the home gateway, the home gateway randomly selects one from multiple received PDs that carry the first 56 bits of the IPv6 address and that are sent by the BRAS or GGSN, adds, according to a preset rule, 8 bits behind 56 bits of the Prefix field of the PD carrying the first 56 bits of the IPv6 address to constitute a PD carrying first 64 bits of the IPv6 address, encapsulates the PD carrying the first 64 bits of the IPv6 address in the ICMPv6 packet, and sends the ICMPv6 packet to the user device by using the RA protocol. The user device generates a last 64 bits of the IPv6 address according to a MAC address of this equipment and an EUI-64 rule, combines 64 bits of the Prefix field of the PD carrying the first 64 bits of the IPv6 address with the last 64 bits of the IPv6 address to constitute a 128-bit IPv6 address, and accesses a network by using a link identified by a PD that carries the first 56 bits of the IPv6 address and that is included in the IPv6 address.

In the prior art, user device may be connected to a network by using multiple links, but, at a moment, can only access the network according to one IPv6 address by using a link identified by a PD that corresponds to the IPv6 address and that carries first 56 bits of the IPv6 address and cannot access the network by using the rest of the links, resulting in low utilization of network resources.

SUMMARY

Embodiments of the present invention provide an IPv6 address assignment method and apparatus to improve utilization of network resources.

One aspect of the embodiments of the present invention provides an IPv6 address assignment method, including:
  receiving first PDs (Prefix Delegation) sent by at least two network access devices, where the first PDs sent by the different network access devices are different from each other;
  generating second PDs according to the received first PDs, where the second PDs have a one-to-one correspondence with the first PDs; and
  sending the generated second PDs to user device for generating by the user device IPv6 addresses according to the second PDs.

Another aspect of the embodiments of the present invention provides an IPv6 address assignment method, including:
  receiving second PDs (Prefix Delegation) sent by a home gateway, where the second PDs are prefixes generated by the home gateway according to received first PDs that are sent by at least two network access devices, the first PDs sent by the different network access devices are different from each other, and the second PDs have a one-to-one correspondence with the first PDs; and
  generating IPv6 addresses according to the second PDs.

Another aspect of the embodiments of the present invention provides a home gateway, including:
  a first receiving module, configured to receive first PDs (Prefix Delegation) sent by at least two network access devices, where the first PDs sent by the different network access devices are different from each other;
  a second-delegated-prefix generation module, configured to generate second PDs according to the received first PDs, where the second PDs have a one-to-one correspondence with the first PDs; and
  a sending module, configured to send the generated second PDs to user device for generating by the user device IPv6 addresses according to the second PDs.

Another aspect of the embodiments of the present invention provides user device, including:
  a second receiving module, configured to receive second PDs sent by a home gateway, where the second PDs are prefixes generated by the home gateway according to received first PDs that are sent by at least two network access devices, the first PDs sent by the different network access devices are different from each other, and the second PDs have a one-to-one correspondence with the first PDs; and
  an IPv6 address generation module, configured to generate IPv6 addresses according to the second PDs.

Another aspect of the embodiments of the present invention provides a home gateway, including a transceiver and a processor, where:

the transceiver is configured to receive first PDs sent by at least two network access devices, where the first PDs sent by the different network access devices are different from each other;

the processor is configured to execute a program instruction stored in a memory to perform the following operation: generating second PDs according to the received first PDs, where the second PDs have a one-to-one correspondence with the first PDs; and the transceiver is further configured to send the generated second PDs to user device for generating by the user device IPv6 addresses according to the second PDs.

Another aspect of the embodiments of the present invention provides user device, including a receiver and a processor, where:

the receiver is configured to receive second PDs sent by a home gateway, where the second PDs are prefixes generated by the home gateway according to received first PDs that are sent by at least two network access devices, the first PDs sent by the different network access devices are different from each other, and the second PDs have a one-to-one correspondence with the first PDs; and the processor is configured to execute a program instruction stored in a memory to perform the following operation: generating IPv6 addresses according to the second PDs.

Another aspect of the embodiments of the present invention provides an IPv6 address assignment system, including the home gateway and the user device.

In the IPv6 address prefix assignment method and apparatus provided in the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

BRIEF DESCRIPTION OF DRAWINGS

FIG. 1 is a signaling diagram of an IPv6 address assignment method in the prior art;

FIG. 2 is a frame format diagram of a PD in the prior art;

DESCRIPTION OF EMBODIMENTS

Figure 3:
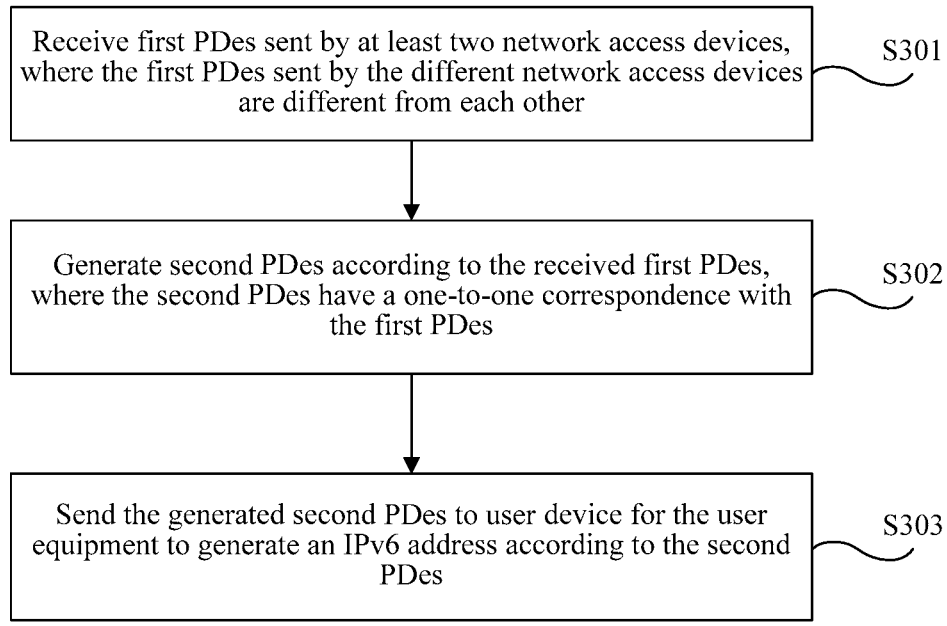
FIG. 3 is a flowchart of an IPv6 address assignment method according to an embodiment of the present invention.

FIG. 3 is a flowchart of an IPv6 address assignment method according to an embodiment of the present invention. This embodiment of the present invention is applicable to: when user device accesses a network, basing on an IPv6 address prefix assigned by a home gateway to the user device, combining the IPv6 address prefix with a last 64 bits, locally generated by the user device, of an IPv6 address to constitute an IPv6 address of the user device, and accessing the network according to the IPv6 address, where a specific IPv6 address assignment method is as follows:

Step 301: Receive first PDs sent by at least two network access devices, where the first PDs sent by the different network access devices are different from each other.

The home gateway is connected to multiple network access devices, the multiple network access devices separately send first PDs to the home gateway, the first PDs separately sent by the multiple network access devices are different from each other, and the first PD includes an IPv6 address prefix that can be assigned by a network access device delegated by a network-side server.

Step 302: Generate second PDs according to the received first PDs, where the second PDs have a one-to-one correspondence with the first PDs.

The home gateway adds 8-bit data behind the first PD to extend the 56-bit first PD to a 64-bit second PD, where the 8-bit data is randomly generated by the home gateway, and for a specific generation process, any method in the prior art may be used.

Step 303: Send the generated second PDs to user device for generating by the user device IPv6 addresses according to the second PDs.

The home gateway sends the multiple generated second PDs to the user device at the same time or in batches, the user device generates a postfix of an IPv6 address according to a MAC address of this equipment and an EUI-64 rule and combines the second PDs separately with the postfix of the IPv6 address into multiple 128-bit IPv6 addresses, and the user device accesses the network by using multiple network links according to the multiple 128-bit IPv6 addresses.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

Based on the foregoing embodiment, the sending the generated second PDs to user device includes: generating unique corresponding prefix identifiers according to the second PDs; and sending the generated second PDs and the corresponding prefix identifiers to the user device.

After separately generating multiple corresponding second PDs according to the multiple first PDs, the home gateway generates a unique corresponding prefix identifier for each of the second PDs, and sends the multiple second PDs and respective corresponding prefix identifiers to the user device.

In this embodiment of the present invention, a unique corresponding prefix identifier is generated for each of the second PDs, so as to help the user device identify each second PD from a same protocol packet carrying multiple second PDs.

Figure 4:
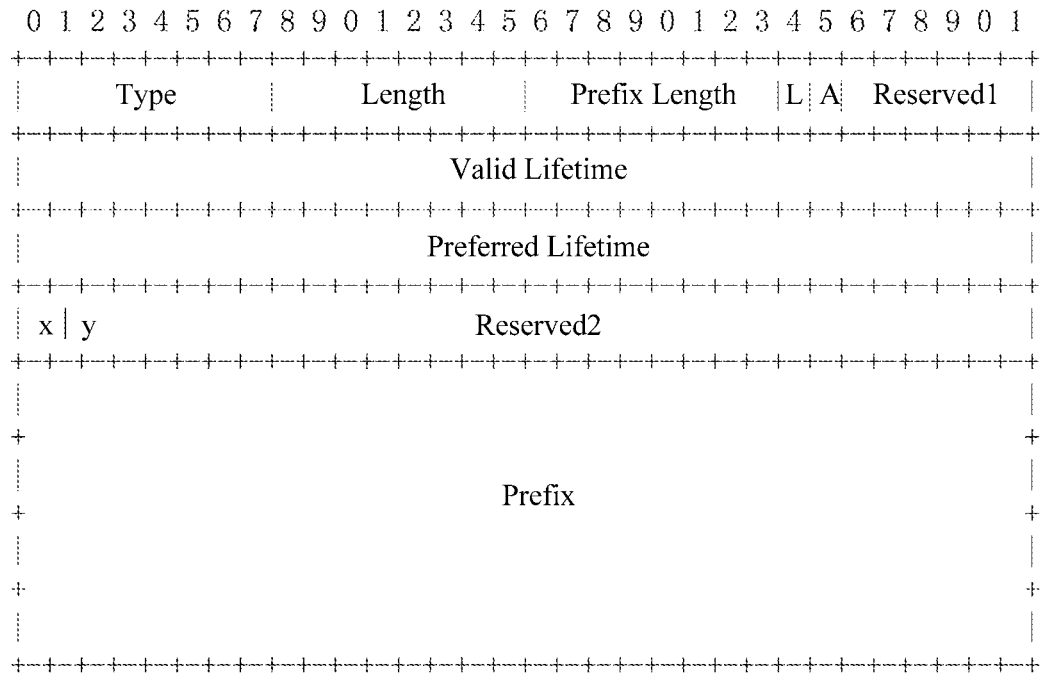
FIG. 4 is a frame format diagram of a PD to which an IPv6 address assignment method according to another embodiment of the present invention is applicable.

FIG. 4 is a frame format diagram of a PD to which an IPv6 address assignment method according to another embodiment of the present invention is applicable. Based on the foregoing embodiment, the prefix identifier is saved in a reserved field of a data frame carrying the second PD, where the data frame is encapsulated in a protocol packet.

As shown in FIG. 4, FIG. 4 is a frame format of a data frame corresponding to a second PD according to this embodiment of the present invention. A "Type" field identifies a type of the data frame and in this embodiment of the present invention, is used for identifying that the data frame is a PD; a "Length" field identifies a total length of the data frame; a "Prefix Length" field identifies a length of a "Prefix" field in the data frame; an "L" field and an "A" field are service quality option fields; "Reserved1" is a reserved field 1; a "Valid Lifetime" field identifies an actual lifetime of the PD, that is, an IPv6 address prefix delegated by a network-side server has a lifetime, and a PD that goes beyond the actual lifetime is invalid; a time identified by a "Preferred Lifetime" field is less than or equal to a time identified by the "Valid Lifetime" field, which indicates that a request for obtaining a new PD should be made to the network-side server within the time identified by the "Preferred Lifetime" field; "x|y" identifies a prefix identifier corresponding to the second PD, and if n bits are selected for the prefix identifier, a maximum of $2^n$ different second PDs can be identified; a "Reserved2" field identifies a reserved field 2; and the "Prefix" field identifies the IPv6 address prefix.

Each of the second PDs is carried in the data frame shown in FIG. 4 separately, an identifier field in the reserved field 2 of each data frame identifies a different second PD, the multiple data frames are all encapsulated in a same protocol packet, and if a total length of the multiple data frames exceeds a maximum length of a protocol packet, the data frame that goes beyond the maximum length is encapsulated in another same protocol packet. In addition, in this embodiment of the present invention, a reserved bit in the reserved field 1 may also be selected as the prefix identifier.

In this embodiment of the present invention, a prefix identifier corresponding to the second PD is selected from a reserved field of a data frame, and the multiple data frames are all encapsulated in a same protocol packet or are separately encapsulated in different protocol packets, so that the home gateway sends the multiple generated second PDs to the user device.

Figure 5:
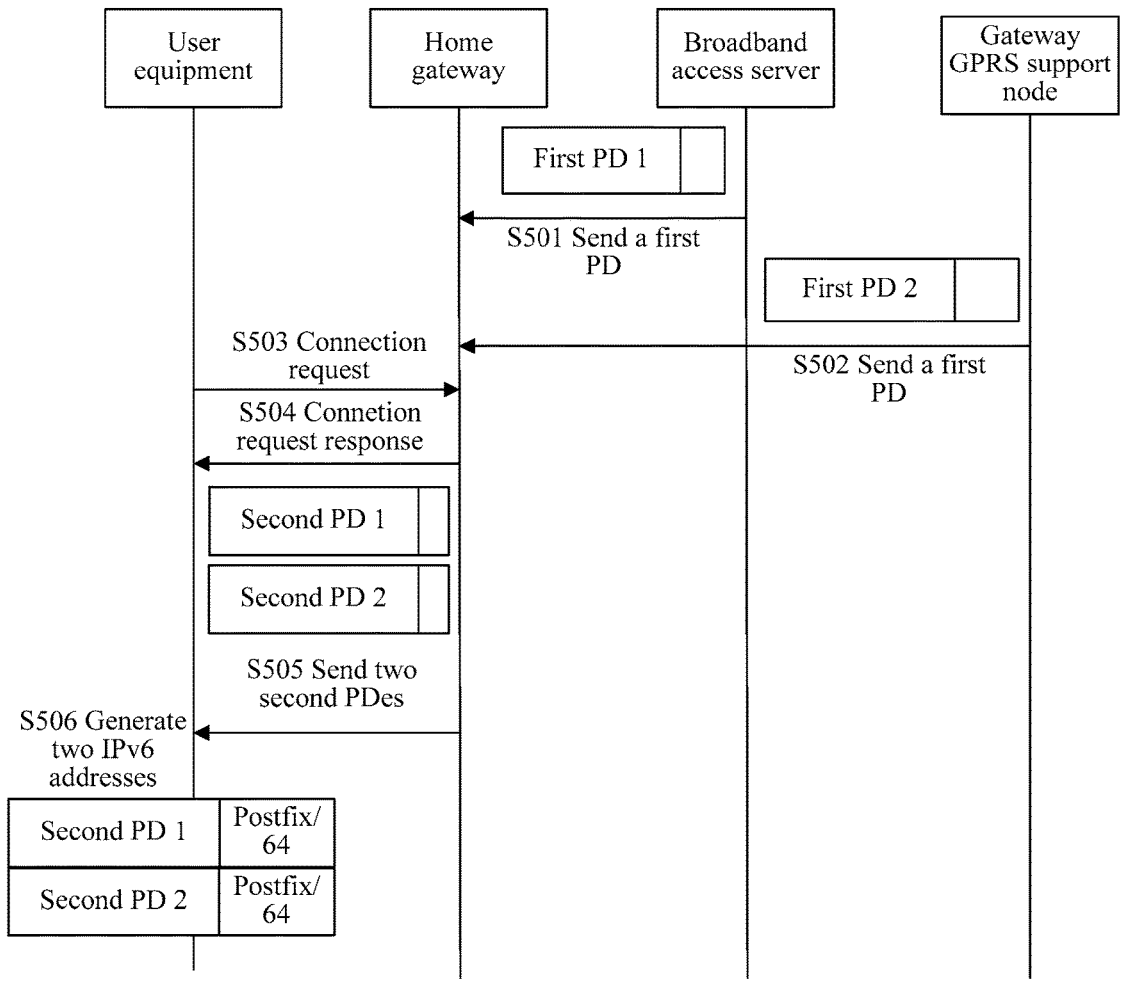
FIG. 5 is a signaling diagram of an IPv6 address assignment method according to another embodiment of the present invention.

FIG. 5 is a signaling diagram of an IPv6 address assignment method according to another embodiment of the present invention. Based on the foregoing embodiment, before the sending the generated second PDs to user device, the method further includes sending the number of the second PDs to the user device. Specific steps of the IPv6 address assignment method according to this embodiment of the present invention are as follows:

Step 501: A BRAS sends a first PD to a home gateway.

Step 502: A GGSN sends a first PD to the home gateway.

The home gateway is connected to both BRAS and GGSN, the BRAS and the GGSN separately send the first PDs to the home gateway, the first PDs are different from each other, and the home gateway separately generates two corresponding second PDs according to the two first PDs.

Step 503: User device sends a connection request to the home gateway.

The user device accesses a network by using the home gateway and sends the connection request to the home gateway to perform network connection.

Step 504: The home gateway sends a connection request response to the user device.

The home gateway sends the connection request response to the user device, where the connection request response includes the number of the second PDs carried in an ICMPv6 packet that is to be sent to the user device.

Step 505: The home gateway sends two second PDs to the user device.

The home gateway sends an ICMPv6 packet to the user device by using an RA protocol, where two second PDs are encapsulated in the ICMPv6 packet.

Step 506: The user device generates two IPv6 addresses.

The user device separately generates two IPv6 addresses according to the two second PDs.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

Figure 6:
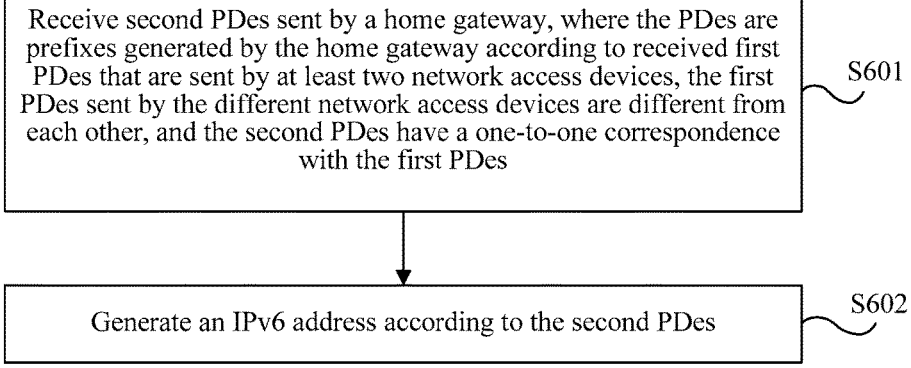
FIG. 6 is a flowchart of an IPv6 address assignment method according to another embodiment of the present invention.

FIG. 6 is a flowchart of an IPv6 address assignment method according to another embodiment of the present invention. Steps of the IPv6 address assignment method according to this embodiment of the present invention are as follows:

Step 601: Receive second PDs sent by a home gateway, where the second PDs are prefixes generated by the home gateway according to received first PDs that are sent by at least two network access devices, the first PDs sent by the different network access devices are different from each other, and the second PDs have a one-to-one correspondence with the first PDs.

User device receives multiple second PDs sent by a home gateway, the home gateway is connected to multiple network access devices, the multiple network access devices separately send first PDs to the home gateway, the first PDs separately sent by the multiple network access devices are different from each other, and the home gateway separately generates, according to the multiple first PDs, multiple corresponding second PDs by extending IPv6 address prefixes included in the first PDs, and sends the multiple generated second PDs to the user device.

Step 602: Generate IPv6 addresses according to the second PDs.

The user device generates a postfix of IPv6 addresses according to a MAC address of this equipment and a 64-bit extended unique identifier (64-bit Extended Unique Identifier, EUI-64 for short) rule in advance or after receiving the multiple second PDes and combines the second PDs separately with the postfix of the IPv6 address into multiple 128-bit IPv6 addresses, and the user device accesses the network by using multiple network links according to the multiple 128-bit IPv6 addresses.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

Based on the foregoing embodiment, the receiving second PDs sent by a home gateway includes: receiving the second PDs and corresponding prefix identifiers that are sent by the home gateway, where the prefix identifiers are unique corresponding identifiers generated by the home gateway according to the second PDs.

After separately generating multiple corresponding second PDs according to the multiple first PDs, the home gateway generates a unique corresponding prefix identifier for each of the second PDs, and sends the multiple second PDs and respective corresponding prefix identifiers to the user device.

The prefix identifiers are saved in a reserved field of a data frame carrying the second PD, where the data frame is encapsulated in a protocol packet.

Each of the second PDs is carried in the data frame shown in FIG. 4 separately, an identifier field in the reserved field 2 of each data frame identifies a different second PD, the multiple data frames are all encapsulated in a same protocol packet, and if a total length of the multiple data frames exceeds a maximum length of a protocol packet, the data frame that goes beyond the maximum length is encapsulated in another same protocol packet. In addition, in this embodiment of the present invention, a reserved bit in the reserved field 1 may also be selected as the prefix identifier.

Before the receiving second PDs sent by a home gateway, the method further includes receiving the number of the second PDs sent by the home gateway.

Before receiving the multiple second PDs, the user device receives the quantity of the second PDs sent by the home gateway to determine in advance the number of second PDs subsequently sent by the home gateway.

In this embodiment of the present invention, a unique corresponding prefix identifier is generated for each of the second PDs, so that the user device can identify the multiple received second PDs; a prefix identifier corresponding to the second PD is selected from the reserved field of the data frame, and the multiple data frames are all encapsulated in a same protocol packet or are separately encapsulated in different protocol packets, so that the home gateway sends the multiple generated second PDs to the user device; according to the number of the second PDs sent by the home gateway, the user device determines in advance the number of second PDs that should be received.

Figure 7:
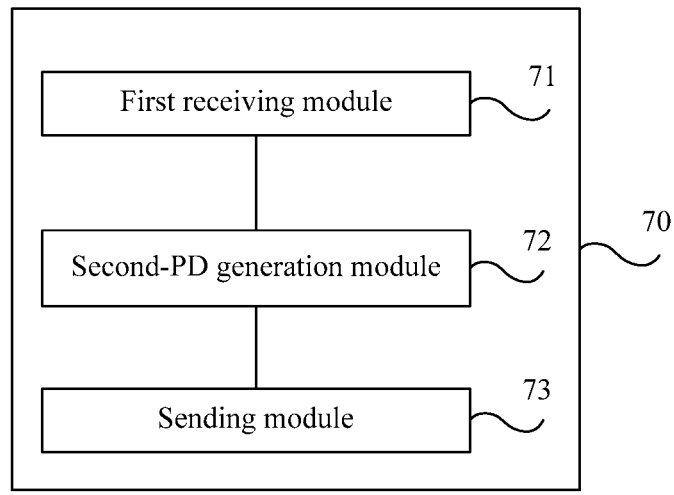
FIG. 7 is a structural diagram of a home gateway according to an embodiment of the present invention.

FIG. 7 is a structural diagram of a home gateway according to an embodiment of the present invention. The home gateway provided in this embodiment of the present invention can execute a processing procedure provided in an embodiment of an IPv6 address assignment method. The home gateway 70 includes a first receiving module 71, a second-delegated-prefix generation module 72, and a sending module 73. The first receiving module 71 is configured to receive first PDs sent by at least two network access devices, where the first PDs sent by the different network access devices are different from each other; the second-delegated-prefix generation module 72 is configured to generate second PDs according to the received first PDs, where the second PDs have a one-to-one correspondence with the first PDs; and the sending module 73 is configured to send the generated second PDs to user device for generating by the user device IPv6 addresses according to the second PDs.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

Figure 8:
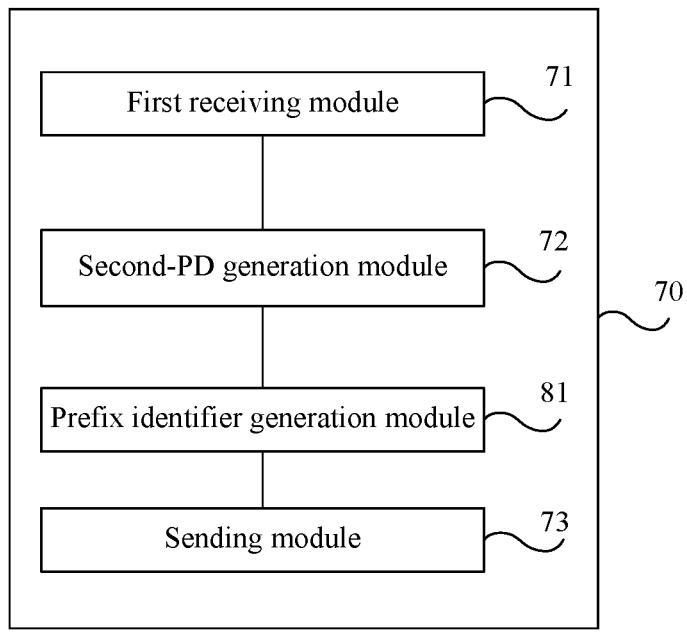
FIG. 8 is a structural diagram of a home gateway according to another embodiment of the present invention.

FIG. 8 is a structural diagram of a home gateway according to another embodiment of the present invention. The home gateway provided in this embodiment of the present invention can execute a processing procedure provided in an embodiment of an IPv6 address assignment method. Based on the foregoing embodiment, the home gateway 70 further includes a prefix identifier generation module 81, configured to generate unique corresponding prefix identifiers according to the second PDs, where the sending module 73 is specifically configured to send the generated second PDs and the corresponding prefix identifiers to the user device.

In this embodiment of the present invention, the prefix identifiers sent by the sending module 73 are saved in a reserved field of a data frame carrying the second PD, where the data frame is encapsulated in a protocol packet.

The sending module 73 is further configured to: before the second PDs generated by the second PDs are sent to the user device, send the number of the second PDs to the user device.

In this embodiment of the present invention, a unique corresponding prefix identifier is generated for each of the second PDs, so that the user device can identify the multiple received second PDs; a prefix identifier corresponding to the second PD is selected from the reserved field of the data frame, and the multiple data frames are all encapsulated in a same protocol packet or are separately encapsulated in different protocol packets, so that the home gateway sends the multiple generated second PDs to the user device; according to the number of the second PDs sent by the home gateway, the user device determines in advance the number of second PDs that should be received.

Reference may be made to the foregoing method embodiments for specific functions of the home gateway provided in this embodiment of the present invention, and details are not described herein again.

Figure 9:
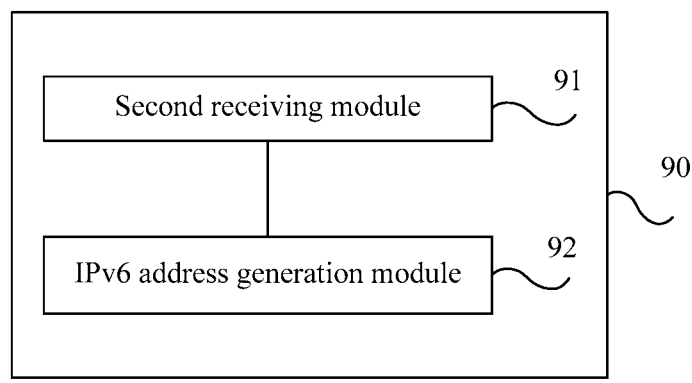
FIG. 9 is a structural diagram of user device according to an embodiment of the present invention.

FIG. 9 is a structural diagram of user device according to an embodiment of the present invention. The user device provided in this embodiment of the present invention can execute a processing procedure provided in an embodiment of an IPv6 address assignment method. The user device 90 includes a second receiving module 91 and an IPv6 address generation module 92, where the second receiving module 91 is configured to receive second PDs sent by a home gateway, where the second PDs are prefixes generated by the home gateway according to received first PDs that are sent by at least two network access devices, the first PDs sent by the different network access devices are different from each other, and the second PDs have a one-to-one correspondence with the first PDs; and the IPv6 address generation module 92 is configured to generate IPv6 addresses according to the second PDs.

In this embodiment of the present invention, the second receiving module 91 is specifically configured to receive the second PDs and corresponding prefix identifiers that are sent by the home gateway, where the prefix identifiers are unique corresponding identifiers generated by the home gateway according to the second PDs.

The prefix identifiers received by the second receiving module 91 are saved in a reserved field of a data frame carrying the second PD, where the data frame is encapsulated in a protocol packet.

The second receiving module 91 is further configured to: before receiving the second PDs sent by the home gateway, receive the number of the second PDs sent by the home gateway.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

Reference may be made to the foregoing method embodiments for specific functions of the user device provided in this embodiment of the present invention, and details are not described herein again.

Figure 10:
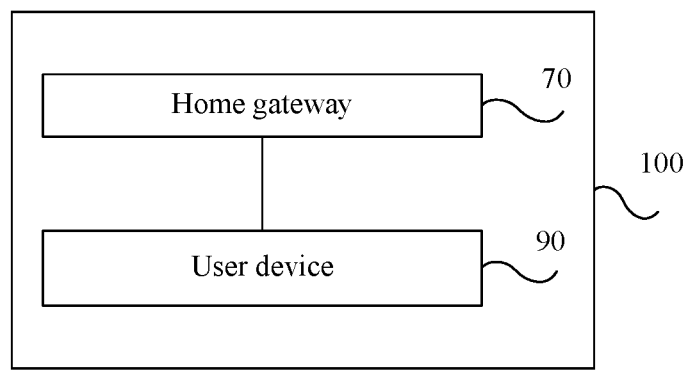
FIG. 10 is a structural diagram of an IPv6 address assignment system according to an embodiment of the present invention.

FIG. 10 is a structural diagram of an IPv6 address assignment system according to an embodiment of the present invention. The IPv6 address assignment system provided in this embodiment of the present invention can execute a processing procedure provided in an embodiment of an IPv6 address assignment method. The IPv6 address assignment system 100 includes the home gateway 70 in the foregoing embodiment and the user device 90 in the foregoing embodiment.

The IPv6 address assignment system provided in this embodiment of the present invention can execute a processing procedure provided in an embodiment of an IPv6 address assignment method.

An embodiment of the present invention provides a home gateway that can execute a processing procedure provided in an embodiment of an IPv6 address assignment method. The home gateway includes a transceiver and a processor, where the transceiver is configured to receive first PDs sent by at least two network access devices, where the first PDs sent by the different network access devices are different from each other; the processor is configured to execute a program instruction stored in a memory to perform the following operation: generating second PDs according to the received first PDs, where the second PDs have a one-to-one correspondence with the first PDs; and the transceiver is further configured to send the generated second PDs to user device for generating by the user device IPv6 addresses according to the second PDs.

The processor is further configured to perform the following step: generating unique corresponding prefix identifiers according to the second PDs; and the transceiver is further configured to send the generated second PDs and the corresponding prefix identifiers to the user device.

The prefix identifiers sent by the transceiver are saved in a reserved field of a data frame carrying the second PD, where the data frame is encapsulated in a protocol packet.

The transceiver is further configured to: before sending the generated second PDs to the user device, send the number of the second PDs to the user device.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

An embodiment of the present invention provides user device that can execute a processing procedure provided in an embodiment of an IPv6 address assignment method. The home gateway includes a transceiver and a processor, and the user device includes a receiver and a processor. The receiver is configured to receive second PDs sent by the home gateway, where the second PDs are prefixes generated by the home gateway according to received first PDs that are sent by at least two network access devices, the first PDs sent by the different network access devices are different from each other, and the second PDs have a one-to-one correspondence with the first PDs; and the processor is configured to execute a program instruction stored in a memory to perform the following operation: generating IPv6 addresses according to the second PDs.

The receiver is specifically configured to receive the second PDs and corresponding prefix identifiers that are sent by the home gateway, where the prefix identifiers are unique corresponding identifiers generated by the home gateway according to the second PDs.

The prefix identifiers received by the receiver are saved in a reserved field of a data frame carrying the second PD, where the data frame is encapsulated in a protocol packet.

The receiver is further configured to: before receiving the second PDs sent by the home gateway, receive the number of the second PDs sent by the home gateway.

In this embodiment of the present invention, multiple second PDs are sent to user device by using a home gateway for the user device to separately generate multiple IPv6 addresses according to the multiple second PDs, so as to enable the user device to access a network by using multiple network links at a same moment, thereby improving utilization of network resources.

An embodiment of the present invention provides an IPv6 address assignment system that can execute a processing procedure provided in an embodiment of an IPv6 address assignment method. The IPv6 address assignment system includes the home gateway in the foregoing embodiment and the user device in the foregoing embodiment.

The IPv6 address assignment system provided in this embodiment of the present invention can execute a processing procedure provided in an embodiment of an IPv6 address assignment method.

In conclusion, in the embodiments of the present invention, a unique corresponding prefix identifier is generated for each of the second PDs, so that user device can identify the multiple received second PDs; a prefix identifier corresponding to a second PD is selected from a reserved field of a data frame, and the multiple data frames are all encapsulated in a same protocol packet or are separately encapsulated in different protocol packets, so that a home gateway sends the multiple generated second PDs to the user device; according to the number of the second PDs sent by the home gateway, the user device determines in advance the number of second PDs that should be received; the multiple second PDs are sent to the user device by using the home gateway for the user device to separately generate multiple IPv6 addresses according to the multiple second PDs, so that the user device can access a network by using multiple network links at a same moment, thereby improving utilization of network resources.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for IPv6 address assignment system, comprising:
   sending, by a first network access device, a first Prefix Delegation (PD) 1 to a home gateway;
   sending, by a second network access device, a first PD 2 to the home gateway; wherein the first PD 1 and the first PD 2 are different from each other;
   generating, by the home gateway, a second PD 1 according to the first PD 1 and a second PD 2 according to the first PD 2;
   sending, by a user device, a Connection request to the home gateway;
   in response to the Connection request, sending, by the home gateway, a number of second PDs, so that the user device determines in advance, according to the number of second PDs, the number of the second PDs sent from the home gateway;
   sending, by the home gateway, the second PD 1 and the second PD 2 to the user device and
   generating, by the user device, a IPv6 addresses 1 according to the second PD 1 and a IPv6 addresses 2 according to the second PD 2.

2. The method according to claim 1, wherein sending, by the home gateway, the second PD 1 and the second PD 2 to the user device further comprises:
   generating, by the home gateway, unique prefix identifier 1 according to the second PD 1 and; and unique prefix identifier 2 according to the second PD 2; and
   sending, by the home gateway, the second PD1, the unique prefix identifier 1, the second PD2, the unique prefix identifier 2 to the user device.

3. The method according to claim 2, further comprising:
   saving, by the home gateway, the prefix identifier 1 in a reserved field of a data frame carrying the second PD 1 and the prefix identifier 2 in a reserved field of a data frame carrying the second PD 2; wherein the data frames are encapsulated in a protocol packet.

4. The method according to claim 3, further comprising:
   before sending, by the home gateway, the second PD 1 and the second PD 2 to the user device;
   sending, by the home gateway, the Connection request response to the device; wherein the Connection request response contains the number of the second PDs send to the user device.

5. The method according to claim 2, further comprising:
   before sending, by the home gateway, the second PD 1 and the second PD 2 to the user device;
   sending, by the home gateway, the Connection request response to the device; wherein the Connection request response contains the number of the second PDs send to the user device.

6. The method according to claim 1, further comprising:
   before sending, by the home gateway, the second PD 1 and the second PD 2 to the user device,
   sending, by the home gateway, the Connection request response to the device; wherein the Connection request response contains the number of the second PDs send to the user device.

7. A method for IPv6 address assignment, comprising:
   receiving, by a home gateway, a first Prefix Delegation (PD) 1 sent by a first network access device;
   receiving, by a home gateway, a first PD 2 sent by a second network access device; wherein the first PD 1 and the first PD 2 are different from each other;
   generating, by the home gateway, a second PD 1 according to the first PD 1 and a second PD 2 according to the first PD 2;
   receiving, by the home gateway, a Connection request sent by a user device; and
   in response to the Connection request, sending, by the home gateway, a number of second PDs, so that the user device determines in advance, according to the number of second PDs, the number of the second PDs sent from the home gateway;
   sending, by the home gateway, the second PD 1 and the second PD 2 to the user device for generating by the user device IPv6 addresses according to the second PD 1 and the second PD 2.

8. The method according to claim 7, wherein sending, by the home gateway, the second PD 1 and the second PD 2 to the user device further comprises:
   generating, by the home gateway, unique prefix identifier 1 according to the second PD 1 and; and unique prefix identifier 2 according to the second PD 2; and
   sending, by the home gateway, the second PD1, the unique prefix identifier 1, the second PD2, and the unique prefix identifier 2 to the user device.

9. The method according to claim 8, further comprising:
   saving, by the home gateway, the prefix identifier 1 in a reserved field of a data frame carrying the second PD 1 and the prefix identifier 2 in a reserved field of a data frame carrying the second PD 2; wherein the data frames are encapsulated in a protocol packet.

10. The method according to claim 9, further comprising:
before sending, by the home gateway, the second PD 1 and the second PD 2 to the user device, and
sending, by the home gateway, the Connection request response to the device; wherein the Connection request response contains the number of the second PDs send to the user device.

11. The method according to claim 8, further comprising:
before sending, by the home gateway, the second PD 1 and the second PD 2 to the user device, and
sending, by the home gateway, the Connection request response to the device; wherein the Connection request response contains the number of the second PDs send to the user device.

12. The method according to claim 7, further comprising:
before sending, by the home gateway, the second PD 1 and the second PD 2 to the user device; and
sending, by the home gateway, the Connection request response to the device; wherein the Connection request response contains the number of the second PDs send to the user device.

13. A home gateway, comprising a transceiver and a processor, wherein:
the transceiver is configured to receive a first PD 1 (Prefix Delegation) sent by a first network access device and receive a first PD 2 sent by a second network access device; wherein the first PD 1 and the first PD 2 are different from each other;
the processor is configured to generate a second PD 1 according to the first PD 1 and a second PD 2 according to the first PD 2; and
the transceiver is further configured to receive a Connection request sent by a user device, and in response to the Connection request, send, by the home gateway, a number of second PDs, so that the user device determines in advance, according to the number of second PDs, the number of the second PDs sent from the home gateway, and send the second PD 1 and the second PD 2 to the user device for generating by the user device IPv6 addresses according to the second PD 1 and the second PD 2.

14. The home gateway according to claim 13, wherein the processor is further configured to generate unique prefix identifier 1 according to the second PD 1 and unique prefix identifier 2 according to the second PD 2; and
send the second PD1, the unique prefix identifier 1, the second PD2, and the unique prefix identifier 2 to the user device.

15. The home gateway according to claim 14, wherein the processor is further configured to save the prefix identifier 1 in a reserved field of a data frame carrying the second PD 1 and the prefix identifier 2 in a reserved field of a data frame carrying the second PD 2; wherein the data frames are encapsulated in a protocol packet.

16. The home gateway according to claim 15, wherein the transceiver is further configured to:
before sending the second PD 1 and the second PD 2 to the user device, and
send the Connection request response to the device; wherein the Connection request response contains the number of the second PDs send to the user device.

17. The home gateway according to claim 14, wherein the transceiver is further configured to:
before sending the second PD 1 and the second PD 2 to the user device, and
send the Connection request response to the device; wherein the Connection request response contains the number of the second PDs send to the user device.

18. The home gateway according to claim 13, wherein the transceiver is further configured to:
before sending the second PD 1 and the second PD 2 to the user device; and
send the Connection request response to the device; wherein the Connection request response contains the number of the second PDs send to the user device.

* * * * *

UNITED STATES PATENT AND TRADEMARK OFFICE
CERTIFICATE OF CORRECTION

PATENT NO. : 10,044,672 B2  
APPLICATION NO. : 15/123448  
DATED : August 7, 2018  
INVENTOR(S) : De Liu and Jinfeng Zhang Page 1 of 1

It is certified that error appears in the above-identified patent and that said Letters Patent is hereby corrected as shown below:

In the Claims

Column 12, Line 2: "PD 1 and; and" should read "PD 1; and"  
Column 12, Line 18: "send" should read "sent"  
Column 12, Line 25: "send" should read "sent"  
Column 12, Line 32: "send" should read "sent"  
Column 12, Line 56: "comprises" should read "comprising"  
Column 12, Line 58: "PD 1 and; and" should read "PD 1; and"

Column 13, Line 8: "send" should read "sent"  
Column 13, Line 15: "send" should read "sent"  
Column 13, Line 22: "send" should read "sent"

Column 14, Line 23: "send" should read "sent"  
Column 14, Line 31: "send" should read "sent"  
Column 14, Line 38: "send" should read "sent"

Signed and Sealed this  
Twenty-eighth Day of May, 2019

Andrei Iancu  
*Director of the United States Patent and Trademark Office*